United States Patent [19]

Bost

[11] 4,060,005
[45] Nov. 29, 1977

[54] TRANSMISSION ASSEMBLY COMPRISING A MAIN GEARBOX IN SERIES WITH COUNTERSHAFTING PROVIDING AT LEAST TWO GEAR RATIOS

[75] Inventor: Jean Rémy Bost, Bois-Colombes, France

[73] Assignee: Automobiles Peugeot, Paris, France

[21] Appl. No.: 718,966

[22] Filed: Aug. 30, 1976

[30] Foreign Application Priority Data

Sept. 1, 1975  France .................................. 75.26776

[51] Int. Cl.$^2$ .......................... F16H 3/02; G05G 1/00; G05G 13/00
[52] U.S. Cl. ........................................ 74/745; 74/470; 74/471 XY; 74/477; 74/536
[58] Field of Search .............. 74/470, 471 XY, 473 R, 74/477, 536

[56] References Cited

U.S. PATENT DOCUMENTS

| | | | |
|---|---|---|---|
| 2,920,504 | 1/1960 | Sommer | 74/745 |
| 3,292,451 | 12/1966 | Jacklin et al. | 74/477 |
| 3,364,793 | 1/1968 | Eastwood | 74/477 X |
| 3,939,722 | 2/1976 | Stromberg | 74/745 X |

Primary Examiner—Samuel Scott
Assistant Examiner—Lance W. Chandler
Attorney, Agent, or Firm—Burns, Doane, Swecker & Mathis

[57] ABSTRACT

The transmission assembly comprises a gearbox in series with countershafting providing two gear ratios.

In order to allow an easy adaptation of the countershafting to a conventional gearbox and allow a change in the gear ratio of the countershafting while the vehicle is in motion, there is provided in the control mechanism of the countershafting a delay device. This device stores energy corresponding to changes in the position of a gear pre-selecting lever associated with the countershafting so long as the change gear lever of the gearbox is in a position in which a gear ratio of the gearbox is engaged. This device restores the energy as soon as the change gear lever is brought to its neutral position and allows the pre-selected gear of the countershafting to be engaged.

12 Claims, 3 Drawing Figures

TRANSMISSION ASSEMBLY COMPRISING A MAIN GEARBOX IN SERIES WITH COUNTERSHAFTING PROVIDING AT LEAST TWO GEAR RATIOS

The present invention relates to a transmission assembly, in particular for an automobile vehicle, of the type comprising a main gearbox having a plurality of stepped gear ratios in series with a countershafting having at least two gear ratios. Such transmission mechanisms are more particularly intended for commercial vehicles.

Transmissions of this type are controlled either by two distinct levers, one for the gearbox and one for the countershafting, or by a single lever. When there are two distinct levers, the countershafting lever can only be employed without danger for changing from the low range to the high range or inversely when the vehicle is stationary. The mechanisms which have only a single control lever are designed solely for this utilisation and they do not permit the same gearbox model to be used with, or without, countershafting.

An object of the present invention is to permit the easy adaptation of a countershafting having two ratios to a conventional gearbox having stepped ratios so that a single gearbox model may be employed in two configurations on vehicles of different uses either alone or in series with countershafting having two ratios.

Furthermore, the invention must provide maximum safety when changing the ratios while authorizing the changing of range while the vehicle is in motion.

According to the invention, there is provided a transmission assembly, in particular for an automobile vehicle, comprising:
- a gearbox having a plurality of stepped ratios associated with a first control mechanism comprising a change gear lever for selecting and changing said ratios,
- and countershafting having at least two ratios placed in series with the gearbox and associated with a second control mechanism comprising a pre-selecting lever having at least two positions corresponding respectively to the ratios which may be established in said countershafting,
- wherein the second control mechanism comprises a device performing the function of a delay device adapted to retain the instructions to change a ratio of the countershafting, resulting from a change in the position of the pre-selecting lever, actuating means being provided between the first mechanism and said device for suppressing the retention when the change gear lever is brought to a given position.

According to other features:
- the second control mechanism comprises a sliding rod, a second sliding rod parallel to the first sliding rod, and means for locking the first rod, the actuating means acting on said locking means through the second rod;
- the locking means comprise a latch member mounted to be slidable transversely with respect to the two rods and having a length exceeding the gap between the two rods and cooperating with notches provided respectively on the two rods;
- the unlocking is achieved by actuation of the selecting lever or the change gear lever of the main gearbox.

Embodiments of the invention will be described in the ensuing description with reference to the accompanying drawings, in which.

Figure 1:
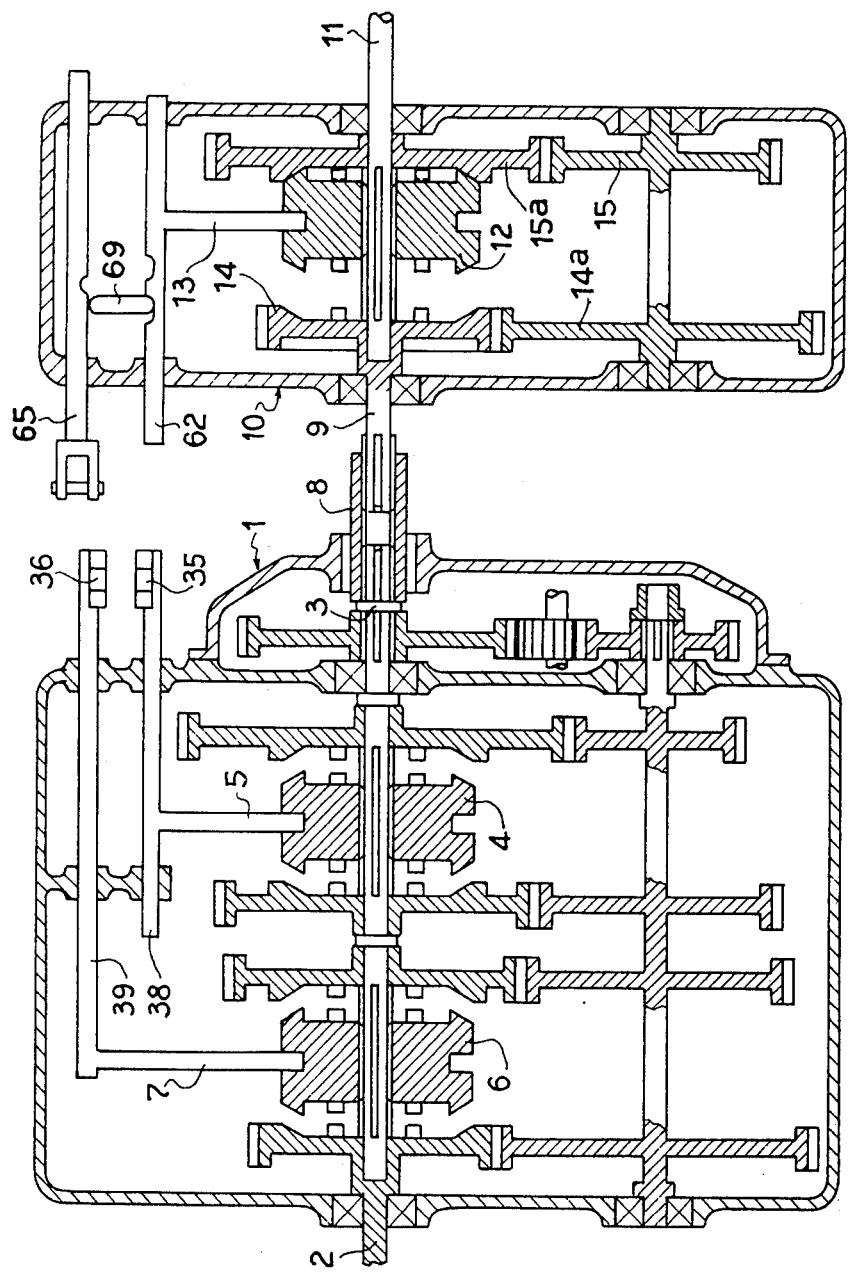
FIG. 1 is a diagrammatic assembly view of the transmission mechanism.

FIG. 1 shows a gearbox 1 whereby it is possible to establish four transmission ratios in forward speed and one transmission ratio in reverse speed, between an input shaft 2 and an output shaft 3. A synchronizer 4, shifted by a fork 5, permits the engagement of the first or the second speed. A synchronizer 6, shifted by a fork 7, permits the engagement of the third or the fourth speed. This gearbox is of conventional type having permanently-engaged gear pinions in the illustrated embodiment, and will not be described in detail.

The output shaft 3 is connected through a coupling device 8 to an input shaft 9 of a countershafting 10 which is capable of establishing two transmission ratios between said input shaft 9 and an output shaft 11.

A synchronizer 12, shifted by a fork 13, permits obtaining the chosen ratio which corresponds to the higher range or the lower range. The higher range is obtained by shifting the synchronizer 12 to the left as viewed in FIG. 1. In this case, there is a direct connection between the input shaft 9 and the output shaft 11. The low range is obtained when the synchronizer 12 occupies the position shown in FIG. 1, the transmission between the shaft 9 and the shaft 11 being then through two couples of permanently-engaged pinions 14, 14a and 15, 15a.

The gearbox 1 is controlled by a change gear lever 17 (FIG. 2) which is mounted to be pivotable on a transverse pin 18 carried by a fork 19 disposed at the end of a shaft 20 which is fixed in translation but capable of pivoting about its axis.

The shaft 20 carries at its other end a lever 21 terminating in a ball-and-socket joint 22 whereby a link 23 is pivotably connected to the lever 21, the link 23 being pivotably connected, by another ball-and-socket joint 24 to a lever 25. The latter is integral with a shaft 26 carrying a fork 27 constituting connecting means between the branches of which there is disposed a finger member 28 integral with a rotatable and slidable shaft 29.

The change gear lever 17 has a lower extension portion 30 terminating in a ball-and-socket joint 31 pivotably connecting the portion 30 to a link 32 which is pivotably connected by another ball-and-socket joint to a lever 34 integral with the shaft 29.

The finger member 28 constitutes shifting means and is capable of being engaged between the branches of one of the forks 35, 36 or 37 which are respectively integral with sliding rods 38, 39 and 40.

The rod 38 is integral with the fork 5 shifting the synchronizer 4 of the first and second speeds. The rod 39 is integral with the fork 7 shifting the synchronizer 6 of the third and fourth speeds. The rod 40 is integral with a fork (not shown) for shifting to the reverse speed.

The countershafting 10 is controlled by a pre-selecting lever 41 which is pivotably mounted on a transverse pin 42. A sleeve 43 encompassing the lever 41 has a lateral finger member 44 which elastically yieldable means (not shown) maintain in one of the notches 45 and 46 of the fixed sector 47.

The lever 41 is extended downwardly by a lever 48 pivotably mounted on a rod 49 which is in two parts defining two abutments 50, 51 for washers 52, 53 between which washers there is disposed a compression spring 54. The washers 52, 53 are maintained by their peripheral portions between a shoulder 55 of a hollow cylindrical body 56 and a stop ring 57 disposed in this body.

The cylinder 56 is extended beyond the abutment 50 of the rod 59 and pivoted to a lever 58. The latter is integral with a shaft 59 carrying a finger member 60 which is engaged between two branches of a fork 61 integral with the fork 13 of the synchronizer of the countershafting 10.

The fork 51 is moreover integral with a slidable rod 62 having two notches 63 and 64.

A rod 65, parallel to the rod 62, is connected by a link 66 to an L-shaped lever 67 integral with the lever 25. The rod 65 has a groove 68 and between the rods 62, 65 there is disposed a latch member 69 which is slidable in a fixed bore and has a length exceeding the space between the rods 62 and 65.

The groove 68 is disposed on the rod 65 in such manner as to be facing the latch member 69 for a half-travel of the finger member 28 between the forks 35 and 36.

The notches 63, 64 have an axial length substantially greater than the diameter of the latch member 69. The latter constitutes a means for locking the rod 62 and is withdrawn and authorises the sliding of the rod 62 only when the latch member faces the groove 68 of the rod 65.

Figure 2:
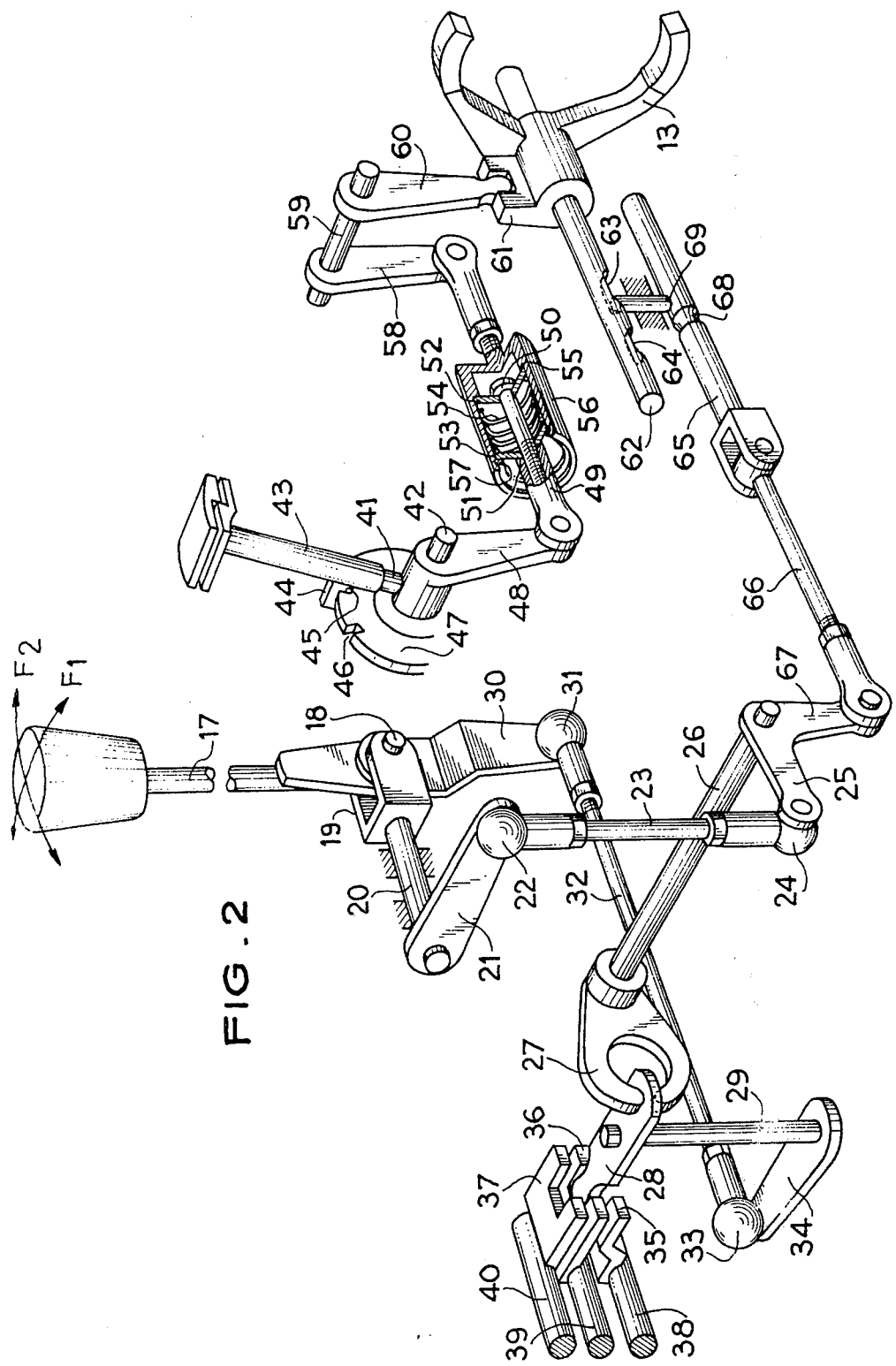
FIG. 2 is a perspective view showing the means controlling the gearbox and the countershafting.

The assembly just described operates in the following manner:

In FIG. 2, the change gear lever 17 is represented in the neutral position and the lever 41 occupies, for example, the upper range position, the synchronizer 12 of the countershafting 10 also being in the upper range position.

In this position, it is possible to obtain in succession the four ratios of the forward speeds of the gearbox 1 by shifting the lever 17 in the usual manner, the selection being achieved by a movement in the direction of arrow $F^1$ and the engagement by a movement in the direction of arrow $F^2$.

The selecting movement causes, in particular, the rotation of the shaft 26 and consequently the translation of the shaft 29 which brings the finger member 28 in the region of the selected fork 35 or 36. Rotation of the shaft 26 produces, moreover, the sliding of the rod 65 whose groove 68 is shifted from one side of the latch member 69 to the other. When the groove 68 passes in front of the latch member 69, the rod 62 is unlocked, but as no force is exerted on the latter, it is not displaced.

The speed engaging movement produces the axial displacement of the previously selected rod 38 or 39 and this has for effect to engage the desired speed. This movement has no effect on the rod 65.

When the vehicle is travelling normally, with a speed engaged in the gearbox 1, it is possible to shift the lever 41 and causes the finger member 44 to move from the notch 45 to the notch 46. However, this movement merely results in a compression of the spring 64 since the rod 62 is locked in position by the latch member 69. The changing of the speed range does not occur at this moment. It is merely prepared.

In order that the speed range changing become effective the change gear lever 17 must be shifted in the direction of arrow $F^1$ from the first-second speed selecting position to the third-fourth speed selecting position, or vice versa. This movement causes, as mentioned hereinbefore, the rod 65 to slide, and the groove 68 passes in the middle of its travel in front of the latch member 69. At this moment, as the rod 62 is momentarily unlocked, it is shifted axially by the expansion of the spring 54 and this changes the ratio in the countershafting 10.

The reverse operation takes place in the same way. It can be seen that the device according to the invention permits an easy adaptation to a conventional gearbox 1 of a countershafting 10 providing two ratios for the purpose of doubling the number of possible ratios.

Moreover, this adaptation ensures maximum safety in operation for changing the speed range which can be carried out with the vehicle in motion. Thus, in particular, the effective changing of the speed range occurs only when the main gearbox is in the neutral position and this avoids any shock in the gearbox and limits the work of the synchronizer of the countershafting.

Moreover, as the speed range is changed only when a change in the selected speed line is made in the main gearbox, excessive variations in the speed of the engine driving the vehicle are avoided.

Figure 3:
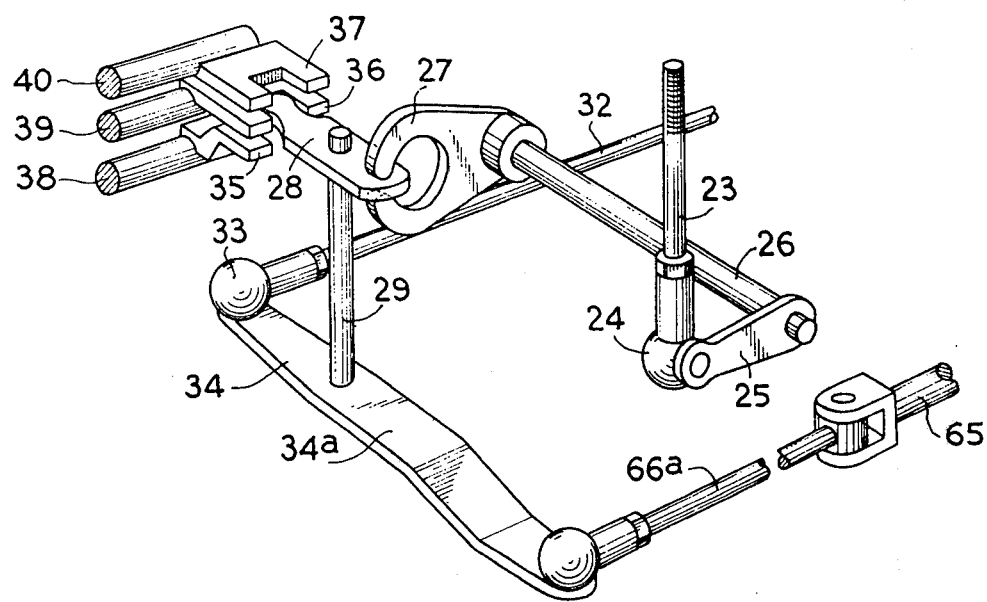
FIG. 3 is a partial view, similar to FIG. 2, in respect of a modification.

In the embodiment shown in FIG. 3, the lever 67 of the foregoing embodiment no longer exists. The rod 65 is connected to the change gear lever 17 by an extension 34a of the lever 34 and by a link 66a.

In this case the groove 68 is located in front of the latch member 69 when the change gear lever 17 is in the neutral position, irrespective of the selected speed line.

Consequently, when a change in the speed range is prepared by shifting the lever 41 while a speed is engaged in the gearbox 1, it becomes effective upon the first change in the speeds by the lever 17.

As in the preceding embodiment, this speed range change can only occur at the precise moment when the gearbox 1 is in its neutral position.

It is interesting to note that in either of the two illustrated embodiments, a speed ratio in the main gearbox 1 cannot be engaged if the speed range change is not finished in the countershafting 10, since the latch member 69 can only disengage from the groove 68 of the rod 65 when it is facing one of the notches 63 or 64, that is to say, when the rod 62 is in either of its extreme positions.

Having now described my invention what I claim as new and desire to secure by Letters Patent is:

1. In a transmission assembly, in particular for an automobile vehicle, comprising:
   a gearbox comprising means providing a plurality of stepped gear ratios and a first control mechanism having a change gear lever movable to various positions for selecting and changing said ratios;
   and countershafting comprising means providing at least two gear ratios placed in series with the gearbox and a second control mechanism having a pre-selecting lever having at least two positions corresponding respectively to said gear ratios of the countershafting;
   the improvement comprising a device performing the function of a delay device adapted to retain instructions to change the gear ratio of the countershafting, which instructions result from a change in the position of said pre-selecting lever, actuating means being provided between the first control mechanism and said device for suppressing the retention of said instructions when the change gear lever is brought to a given position.

2. An assembly as claimed in claim 1, wherein the second control mechanism comprises a fork and a slidable first rod integral with the fork, there being provided a second slidable rod spaced from and parallel to the first rod and locking means for locking the first rod, the actuating means being capable of acting on the locking means through the second rod.

3. An assembly as claimed in claim 2, wherein the locking means comprise a latch member mounted to be transversely slidable relative to the two rods and having a length exceeding the space between the two rods, and recesses provided respectively on the two rods, the latch member being cooperative with the recesses.

4. An assembly as claimed in claim 3, wherein the first rod has two of said recesses respectively corresponding to the positions of the first rod which result in the engagement of either of said gear ratios of the countershafting, and the second rod has a single one of said recesses which is capable of being located in front of the latch member in position of the second rod corresponding to substantially half the travel of the second rod.

5. An assembly as claimed in claim 1, wherein the first control mechanism comprises gear selecting means and gear engaging means connected through suitable means to the change gear lever, the actuating means being disposed between the selecting means and the second rod.

6. An assembly as claimed in claim 5, wherein the actuating means comprise a lever acting on the selecting means and connected to the second rod through a link.

7. An assembly as claimed in claim 1, wherein the first control mechanism comprises gear changing means connected to the second rod through the actuating means.

8. An assembly as claimed in claim 7, wherein a lever is integral with the gear changing means and a link connects the lever of the second rod.

9. An assembly as claimed in claim 1, wherein the device acting as a delay device comprises means for storing and restoring the energy produced by change in position of the pre-selecting lever.

10. An assembly as claimed in claim 9, wherein said storing and restoring means comprise a rod connected to the pre-selecting lever, two radial shoulders on the rod, two washers slidably mounted on a portion of the rod between the two shoulders, which shoulders act as abutments for the washers, a spring in a compressed condition between the two washers, and a body with respect to which body the rod is slidable, the body carrying two abutments for outer faces of the two washers.

11. An assembly as claimed in claim 10, wherein the rod is in two parts.

12. An assembly as claimed in claim 11, wherein one of the two abutments of the body is a member attached to said body.

* * * * *